United States Patent
Long et al.

(10) Patent No.: US 12,044,878 B2
(45) Date of Patent: Jul. 23, 2024

(54) LIGHT GUIDE PLATE, FRONT LIGHT GUIDE STRUCTURE FOR REFLECTIVE TFT SCREEN, AND SUNLIGHT SCREEN

(71) Applicant: NEW VISION DISPLAY TECHNOLOGY (SHENZHEN) CO., LTD., Shenzhen (CN)

(72) Inventors: Dinghua Long, Shenzhen (CN); Haihui Zhang, Shenzhen (CN)

(73) Assignee: NEW VISION DISPLAY TECHNOLOGY (SHENZHEN) CO., LTD., Shenzhen (CN)

( * ) Notice: Subject to any disclaimer, the term of this patent is extended or adjusted under 35 U.S.C. 154(b) by 1 day.

(21) Appl. No.: 18/020,638

(22) PCT Filed: Nov. 19, 2020

(86) PCT No.: PCT/CN2020/130146
§ 371 (c)(1),
(2) Date: Feb. 10, 2023

(87) PCT Pub. No.: WO2022/032915
PCT Pub. Date: Feb. 17, 2022

(65) Prior Publication Data
US 2023/0350127 A1  Nov. 2, 2023

(30) Foreign Application Priority Data

Aug. 14, 2020 (CN) .......................... 202010819716.X
Aug. 14, 2020 (CN) .......................... 202021708882.4

(51) Int. Cl.
*F21V 8/00* (2006.01)

(52) U.S. Cl.
CPC ......... *G02B 6/0043* (2013.01); *G02B 6/0065* (2013.01)

(58) Field of Classification Search
CPC .... G02B 6/0043; G02B 6/0065; G02B 6/005; G02B 6/0031; G02F 1/133615
See application file for complete search history.

(56) References Cited

U.S. PATENT DOCUMENTS 6,700,632 B2 *  3/2004  Taniguchi ............ G02B 6/0065
                                                    361/26
10,823,897 B2 * 11/2020  Sang .................... G02B 6/0036
(Continued)

FOREIGN PATENT DOCUMENTS

CN        103364865 A     10/2013
CN        104064118 A      9/2014
(Continued)

*Primary Examiner* — Peggy A Neils
(74) *Attorney, Agent, or Firm* — Bayramoglu Law Offices LLC

(57) ABSTRACT

A light guide plate, a front light guide structure for a reflective thin film transistor (TFT) screen, and a sunlight screen relate to the field of display technologies. The light guide plate includes a light guide substrate. Scattering netted dots are fixed on a side of the light guide substrate, and the scattering netted dots are provided on the light guide substrate by means of ultra-violet (UV) nanoimprint lithography. By providing the scattering netted dots on the light guide substrate by means of UV nanoimprint lithography, the reflectivity of the light guide substrate can be effectively reduced, and a better display effect can thus be obtained.

17 Claims, 3 Drawing Sheets

(56) References Cited

U.S. PATENT DOCUMENTS

2007/0035507 A1    2/2007  Lee
2017/0108720 A1*   4/2017  Tsai .................... G02B 6/0031

FOREIGN PATENT DOCUMENTS

| CN | 206920641 U | 1/2018 |
| CN | 109725381 A | 5/2019 |
| CN | 210982798 U | 7/2020 |

* cited by examiner

LIGHT GUIDE PLATE, FRONT LIGHT GUIDE STRUCTURE FOR REFLECTIVE TFT SCREEN, AND SUNLIGHT SCREEN

CROSS REFERENCE TO THE RELATED APPLICATIONS

This application is the national phase entry of International Application No. PCT/CN2020/130146, filed on Nov. 19, 2020, which is based upon and claims priority to Chinese Patent Applications No. 202010819716.X and No. 202021708882.4, both filed on Aug. 14, 2020, the entire contents of which are incorporated herein by reference.

TECHNICAL FIELD

The present invention belongs to the field of display technologies, and particularly relates to a light guide plate, a front light guide structure for a reflective thin film transistor (TFT) screen, and a sunlight screen.

BACKGROUND

A sunlight screen is a kind of screen that displays by reflecting a light source. In order to meet the requirement for low power consumption and simulate reflective display of natural light, this kind of display screen usually does not emit and transmit light by itself. Limited by its own characteristics, such a display screen cannot provide a display light source by means of a backlight source, instead it needs to achieve a favorable display effect by reflecting external light sources such as natural light or lamplight.

However, this kind of display screen can only be used in the daytime or when additional lighting sources are available. If the weather is bad or the light is dim, the sunlight screen will be too dark to display clearly. The above problem is an urgent technical problem to be solved in the art.

SUMMARY

In order to solve the above problem, the present invention provides a light guide plate, a front light guide structure for a reflective TFT screen, and a sunlight screen.

The present invention adopts the following technical solution to solve the above technical problem. A light guide plate is characterized by including a light guide substrate, scattering netted dots are fixed on a side of the light guide substrate, and the scattering netted dots are provided on the light guide substrate by means of ultra-violet (V) nanoimprint lithography.

According to the present application, the scattering netted dots are prepared by means of a UV nanoimprint lithography technology, which can effectively eliminate burrs at edges of the scattering netted dots and control the haze of the light guide plate, such that a better display effect can be achieved after the light guide plate is used on the reflective TFT screen.

Further, the light guide substrate is an ultra-white glass, polycarbonate (PC) or polymethyl methacrylate (PMMA) plate.

According to the present application, the ultra-white glass may be used as the light guide substrate. The ultra-white glass is not adversely affected by harsh conditions such as high temperature, high humidity or sun exposure, and thus can improve the reliability of the light guide plate when used as the light guide substrate.

The present application further provides a front light guide structure for a reflective TFT screen, including: the light guide plate described above;
a cover glass plate including a glass substrate and AR layers attached to two sides of the glass substrate respectively, the cover glass plate being provided on a side of the light guide plate close to the scattering netted dots, and a gap existing between the cover glass plate and the light guide plate; and
an optical bonding layer attached to a side of the light guide plate away from the cover glass plate.

According to the present application, the strength can be improved by providing the cover glass plate, which in turn can improve the strength of a sunlight screen as a whole. By providing the AR layers on the two sides of the cover glass plate respectively, the light transmittance of the cover glass plate can be greater than 98% and the reflectivity of the cover glass plate is less than 1%, such that neither the definition nor the color of the display content is adversely affected.

Further, a seal is further included, and the seal is circumferentially arranged at an edge of the gap between the cover glass plate and the light guide plate in a sealing manner.

According to the present application, the seal can effectively prevent water and dust from entering the gap between the cover glass plate and the light guide plate.

Further, the seal is a double-sided foam adhesive.

Further, the optical bonding layer is an OCA or OCR.

Further, the AR layer is deposited on a surface of the glass substrate by means of vacuum evaporation or vacuum sputtering, or the AR film can be attached on a surface of the glass substrate.

Further, a lamp bead is arranged on at least one side surface of an edge of the light guide plate adjacent to the scattering netted dots and configured to irradiate the light guide plate.

Further, luminance of a light source in the lamp bead meets the following formula:

$$L_k = L_e A_k / A_k,$$

where L represents the luminance, A represents light transmittance of the light source when the light source transmits through a CF layer in the reflective TFT screen, $L_e$ represents expected reflection luminance, and K represents a light color constituting light of the lamp bead.

In the present application, in the case that the luminance of the light source of each color in the lamp bead meets the above formula, the uniformity of the final displayed color can be guaranteed.

Further, a wavelength of each light color constituting the light of the lamp bead is a wavelength of the corresponding light color that the corresponding light color has the maximum light transmittance when transmitting through the CF layer in the reflective TFT screen.

According to the present application, the wavelength of each light color constituting the light of the lamp bead is set as the wavelength of the corresponding light color that the corresponding light color has the maximum light transmittance when transmitting through the CF layer, such that the luminance can be guaranteed.

Further, the lamp bead is an RGB-LED or a high-color-gamut LED.

The present application further provides a sunlight screen, including the front light guide structure for the reflective TFT screen as described above, and the reflective TFT screen, and the reflective TFT screen is attached to a side of the optical bonding layer away from the light guide plate.

The sunlight screen provided by the present application may have a better display effect and better definition in case of weak light.

Figure 1:
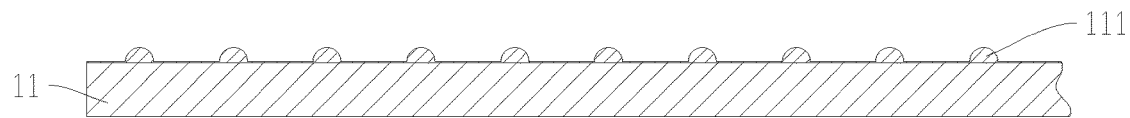
FIG. 1 is a schematic diagram of a layered structure of a light guide plate according to an embodiment.
Figure 2:
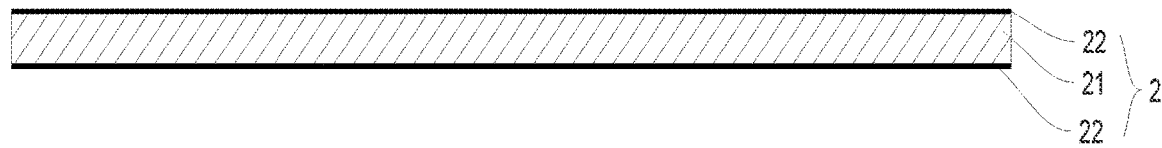
FIG. 2 is a schematic diagram of a layered structure of a cover glass plate according to an embodiment.
Figure 3:
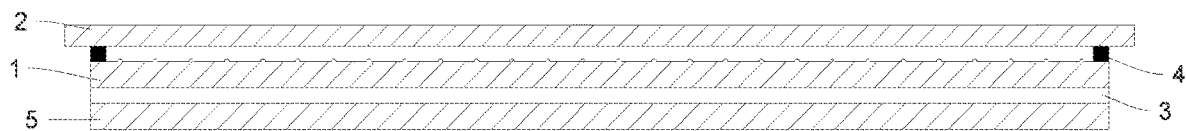
FIG. 3 is a schematic diagram of a layered structure of a sunlight screen according to an embodiment.
Figure 4:
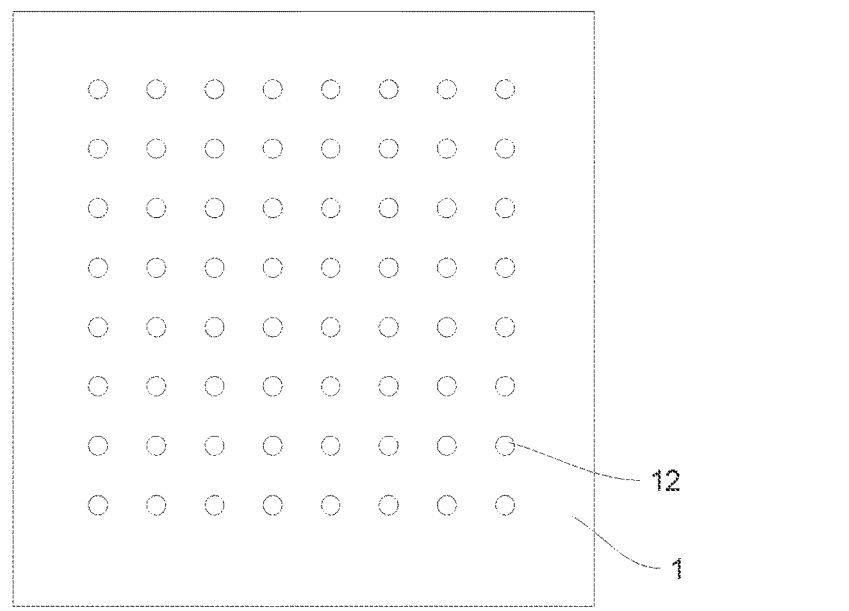
FIG. 4 is a top view of a light guide plate according to an embodiment.
Figure 5:
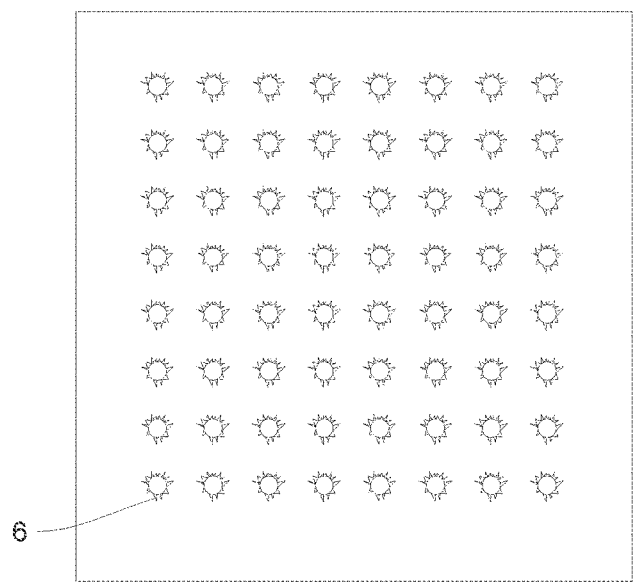
FIG. 5 is a top view of a light guide plate in the prior art.

Reference numbers are listed as below: light guide plate 1; light guide substrate 11; scattering netted dot 111; cover glass plate 2; glass substrate 21; AR layer 22; optical bonding layer 3; seal 4; reflective TFT screen 5; burr 6; and lamp bead 7.

DETAILED DESCRIPTION OF THE EMBODIMENTS

The principles and features of the present invention will be further described hereinafter with reference to the accompanying drawings, and the examples listed herein are only intended to explain the present invention, rather than limiting the scope of the present invention.

Various different implementations or embodiments that implement the described technical solutions of the subject matter are disclosed below. In order to simplify the disclosure, specific embodiments of one or more arrangements in which the respective features are present are described below, but the embodiments listed do not serve as a limitation to the present invention. The connection of a first feature to a second feature, as subsequently documented in the Description, may not only include implementations of direct relation, but also include implementations of forming additional features, and may further include implementations in which the first feature and the second features are indirectly connected or combined using one or more other intervening features, so that the first feature and the second feature may not be directly related.

It should be understood that the following terms in the present application are proper technical terms in the art, and those skilled in the art can confirm the meanings of the following technical terms without any objection.

AR layer: anti-reflective surface coating;
TFT: thin film transistor;
UV: ultraviolet rays;
OCA: optically clear adhesive, a substrate-free double-sided adhesive with an optically transparent layer;
OCR: optical clear resin;
RGB-LED: a light source consisting of red, green and blue LEDS; and
CF: color filter.

The present application discloses an embodiment of a light guide plate 1, including a light guide substrate 11. Scattering netted dots 111 are fixed on a side of the light guide substrate 11. The light guide substrate 11 is preferably made of ultra-white glass. The ultra-white glass is not adversely affected by harsh conditions such as high temperature, high humidity or sun exposure, and thus can improve the reliability of the light guide plate 1 when used as the light guide substrate 11. It should be understood that the light guide substrate 11 above may also be made from PC, PMMA or the like.

This is because, in the prior art, the reflectivity of the scattering netted dot 111 side of the light guide plate 1 is relatively high, and may be usually up to about 4%, leading to a relatively high reflectivity of the whole light guide plate 1. On the one hand, the proportion of light entering a reflective TFT screen 5 may be reduced, and on the other hand, the reflectivity of the light guide plate 1 may be relatively high and may further increase with deepening of the color of a display picture. For example, the reflectivity of the reflective TFT screen 5 is usually about 12-16%. However, the reflectivity of the surface of an ordinary light guide plate 1 accounts for about 25-35%. Therefore, during the operation, white light reflected by the scattering netted dot 111 surface of the ordinary light guide plate 1 and the content light reflected by the reflective TFT screen 5 may be mixed together, and the reflected content light may be diluted, making the display seen by an observer faint and hazy, with low chromaticity, which may in turn lead to insufficiently bright colors.

Figure 6:
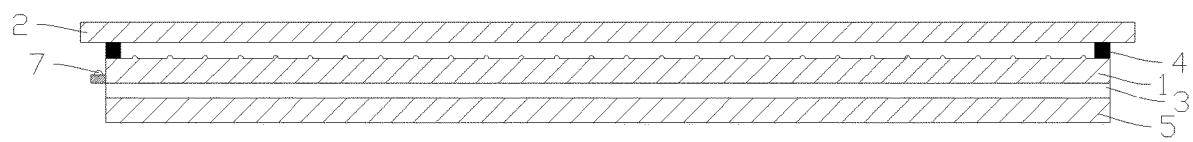
FIG. 6 is a schematic diagram of a layered structure of an embodiment provided with a lamp bead.

According to the present application, it is found that in the prior art, the scattering netted dots 111 on the light guide plate 1 are usually manufactured by means of injection molding, silk screen printing or hot stamping, and these technologies are difficult to control and demand much on manufacture. Thus, burrs 6 as shown in FIG. 6 may be easily caused to edges of the scattering netted dots 111, resulting in high haze of the light guide plate 1. Hence, the light guide plate 1 may turn white on the whole when not lightened in case of sufficient light. In addition, a light bar of the light guide plate 1 is turned on when light is poor and dark. When the light is guided by the light guide plate 1, the light may converge to tips of the burrs 6 to form small bright spots since the burrs 6 are equivalent to cones, which is one of the factors leading to a poor display effect in the dark of the prior art.

In an embodiment of the present application, the scattering netted dots 111 are arranged on the light guide substrate 11 by means of UV nanoimprint lithography. The above problem can be solved by making the scattering netted dots 111 by means of UV nanoimprint lithography, so as to obtain a better display effect. The principle lies in that due to the leveling performance of a UV adhesive, the UV adhesive has a little leveling time before curing, thus forming the scattering netted dots III with smooth edges after curing. Because of the leveling performance of the UV adhesive, its leveling time may be controlled by controlling the intensity of ultraviolet light, such that the haze of the light guide plate 1 may be well controlled. Further, the haze can be controlled within the range of 3% to 5%, and definite content display is realized without adversely affecting the light guide efficiency of the light guide plate 1.

Based on the above, an embodiment of the present application further provides a front light guide structure for a reflective TFT screen, including a light guide plate 1 disclosed by the present application, a cover glass plate 2 and an optical bonding layer 3 which are sequentially arranged according to a layered structure.

The cover glass plate 2 includes a glass substrate 21 and AR layers 22 disposed on two sides of the glass substrate 21 respectively. The AR layers 22 may be deposited on two side surfaces of the glass substrate 21 by means of vacuum evaporation or vacuum sputtering, or the AR films can be attached on two side surfaces of the glass substrate. The cover glass plate 2 is located on the side of the light guide plate 1 close to the scattering netted dots, and a gap exists between the cover glass plate 2 and the light guide plate 1. By providing the AR layers 22 on the two sides of the glass substrate 21, the reflectivity of the glass substrate 21 is reduced, such that the glass substrate 21 may not affect the content display. In addition, reserving a certain gap between the cover glass plate 2 and the light guide plate 1 may avoid a mirror-reflection-like effect which is generated after the light guide plate 1 is attached to the glass substrate 21.

In an embodiment of the present application, the light guide plate 1 is protected by the cover glass plate 2. The cover glass plate 2 can improve the strength, reduce damage to the light guide plate 1 and the reflective TFT screen 5, and further improve the strength of a sunlight screen as a whole.

The optical bonding layer 3 is attached to the side of the light guide plate 1 away from the cover glass plate 2, and the reflective TFT screen 5 is attached to the side of the optical bonding layer 3 away from the cover glass plate 2. In a specific embodiment, the optical bonding layer 3 is an OCA or OCR, both of which have a high transmittance and may not adversely affect transmission of light.

In addition, in order to prevent water and dust from entering the gap between the light guide plate 1 and the cover glass plate 2, in an embodiment of the present application, a seal 4 is further provided, and the seal 4 is circumferentially arranged at the edge of the gap between the cover glass plate 2 and the light guide plate 1 in a sealing manner. Specifically, the seal 4 is double-sided foam adhesive. One side of the double-sided foam adhesive is attached to the edge of the light guide plate 1 in a circumferential direction, and the other side thereof is attached to the edge of the cover glass plate 2.

Figure 7:
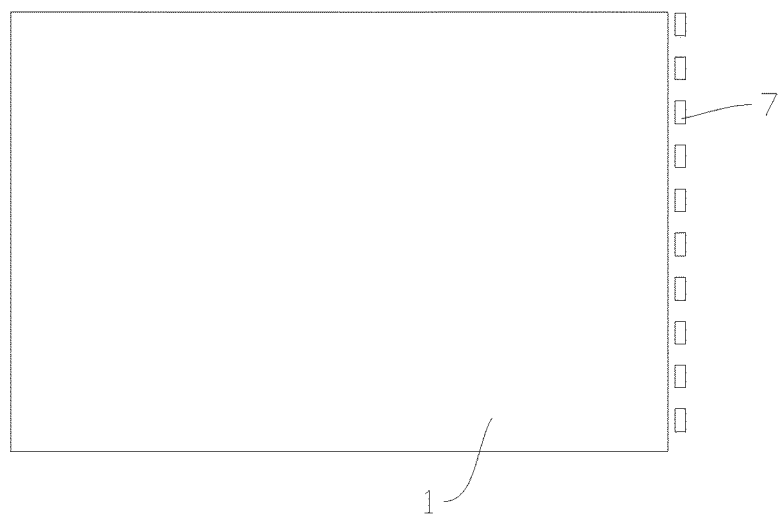
FIG. 7 is a top view of a light guide plate of an embodiment provided with a lamp bead.

In some embodiments, as shown in FIG. 7, the front light guide structure for the reflective TFT screen 5 further includes a lamp bead 7. Specifically, the lamp bead 7 is arranged on a side surface of the light guide plate 1. For example, the lamp bead may be a plurality of individual RGB-LEDs, or a plurality of red, green and blue monochromatic lamps arranged in a certain order, or a plurality of high-color-gamut LEDs.

In an embodiment disclosed by the present application, the lamp bead 7 may be attached to a lamp bead substrate to form a light bar, and the lamp bead substrate may be a PCB or FPC board. The lamp bead substrate is bonded to the side surface of the edge of the light guide plate 1 adjacent to the scattering netted dots 111. The lamp bead 7 is located on the lamp bead substrate and may directly irradiate the light guide plate 1. For example, as shown in FIG. 6, the PCB may be securely bonded to the lower end of a side edge of the light guide plate 1, and the lamp bead 7 is bonded to the upper layer of the PCB; or, the PCB may be bonded to the upper end of the side edge of the light guide plate 1, and the lamp bead 7 may be bonded to the lower layer of the PCB; or the above two structures may be adopted at the same time, which is not specifically limited.

In some examples, the lamp bead may be arranged on one side for lighting, but for large-sized sunlight screens (e.g., 32″ or above), the light bars may be mounted on two opposite sides (for example, longitudinal symmetry or bilateral symmetry) for lighting to achieve better light guide uniformity in the whole display area.

Figure 9A:
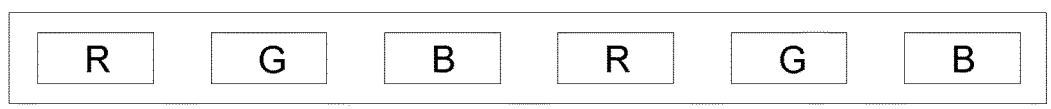
FIG. 9A shows RGB-LED arrangement according to an embodiment.
Figure 9B:
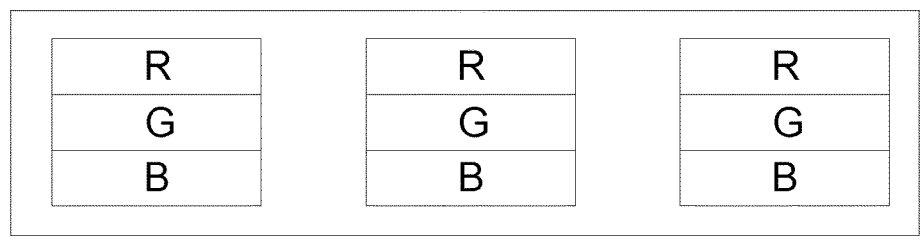
FIG. 9B shows another RGB-LED arrangement according to an embodiment.

In addition, in the prior art, the problem of undesired color uniformity still exists after the reflective TFT screen 5 is combined with the existing light guide plate. This is because, as shown in FIGS. 9A and 9B, in the prior art, the reflective TFT screen 5 includes a reflective TFT layer and a CF layer. During the design and production of the CF layer, due to the used material, material thickness, optical design and other problems, red, green and blue filter layers have selective light transmittance and wavelengths to red light, green light and blue light, and the light transmittance is different.

In order to make light of light source of the lamp bead 7 reflected by the reflective TFT screen 5 have good uniformity and obtain a better display effect, in an embodiment of the present application, the luminance of the light source in the lamp bead 7 meets the following formula:

$$L_k = L_e/A_k/A_k,$$

where L represents the luminance, A represents light transmittance of the light source when the light source passes through the CF layer in the reflective TFT screen 5, K represents the light color constituting light of the lamp bead 7, and $L_e$ represents expected reflection luminance, i.e., the desired reflection luminance after the light passes through the reflective TFT layer.

For example, in some embodiments, the lamp bead 7 may be an RGB-LED or a high-color-gamut LED. By taking an RGB-LED as an example, the lamp bead includes red, blue and green LEDs, and its light is composed of three light colors, i.e., red, green and blue. The luminance of the three-color LEDs may be set separately. The specific RGB-LED may be composed of a plurality of monochromatic LEDs arranged in a certain order as shown in FIG. 9A, or a plurality of RGB-LEDs, i.e., three-color lamp beads, with the arrangement shown in FIG. 9B.

For ease of understanding, the present application gives an explanation by taking a red light source in the RGB-LED lamp bead 7 as an example. When the expected reflection luminance is 100 cd/m², the luminance of the red light source needs to meet the following formula:

$$L_R = 100/A_R/A_R,$$

where R represents a red light color, $L_R$ represents luminance of red light, and $A_R$ represents light transmittance of the red light on the CF layer.

The uniformity of the final display luminance can be guaranteed after the luminance of the light source of each color meets the above formula.

This is because, when the reflective TFT screen 5 is installed, the light guide plate 1 is located on the side of the CF layer in the reflective TFT screen 5 away from the reflective TFT screen 5. When transmitting through the light guide plate 1 and irradiated onto the reflective TFT screen 5, light transmits through the CF layer first, is then irradiated onto the reflective TFT layer, and transmits through the CF layer again after being reflected by the reflective TFT layer. Therefore, after light loss is ignored, the displayed actual luminance is $L_k \times A_k \times A_k$. Thus, by putting the expected luminance $L_e$ into the above formula to replace the actual luminance, the luminance $L_k$ needing to be set may be obtained according to the equation $L_k = L_e/A_k/A_k$.

In some examples, in order to make the light source better transmit through the CF layer, the wavelength of each of light colors that constitute light of the lamp bead 7 is the wavelength of the corresponding light color that the corresponding light color has the maximum light transmittance when transmitting through the CF layer in the reflective TFT screen 5. To facilitate understanding, by taking red light in the RGB-LED as an example, i.e., in the RGB-LED, the set value of the wavelength of the red light is the wavelength of the red light that the red light has the maximum light transmittance when transmitting through the CF layer.

For the ease of understanding, the present application will be described in detail with red, blue and green light sources respectively.

Figure 8:
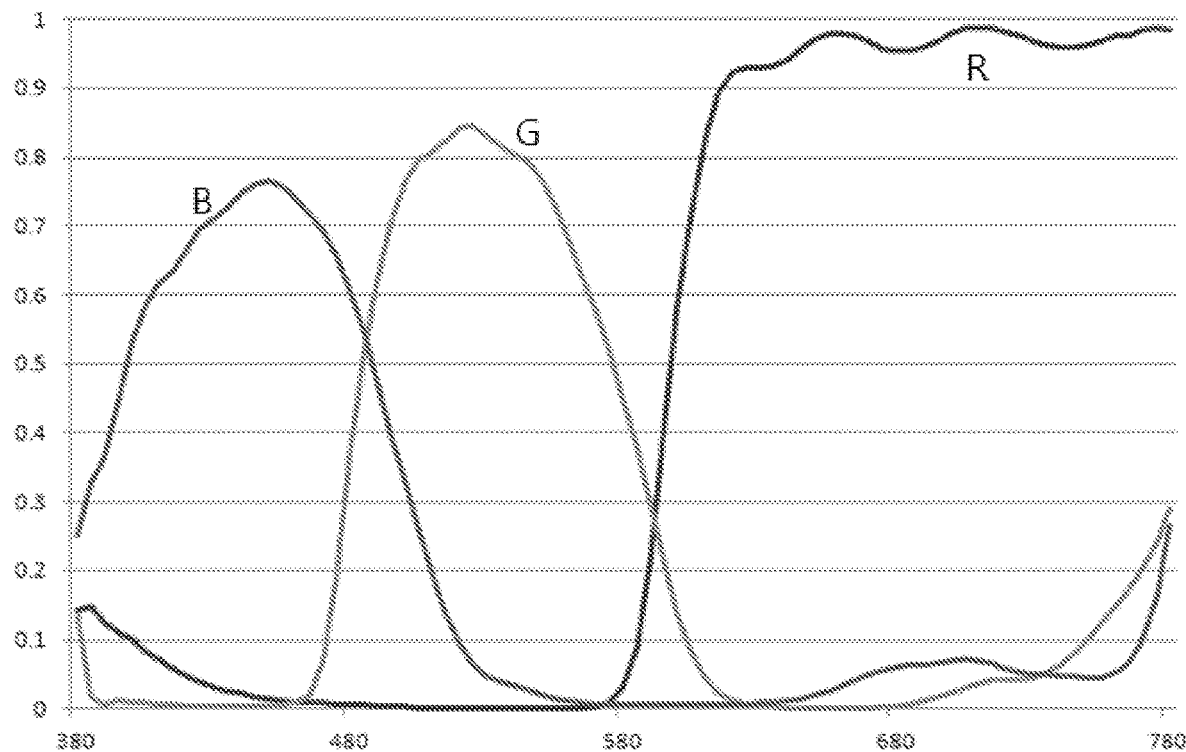
FIG. 8 is a graph showing the relationship between the transmittance and the wavelength of a light source of each color in a CF layer according to an embodiment.

In an embodiment of a TFT screen, the light transmittance and the wavelengths of the CF layer for red, blue and green light are shown in FIG. 8. It can be seen from FIG. 8 that after light of all wavelengths transmits through the CF layer, the light transmittance of red light is 94-98%, with the maximum light transmittance at the wavelength of 660 nm and 730 nm; the light transmittance of green light is 80-85%, with the maximum light transmittance at the wavelength of 530 nm; and the light transmittance of blue light is 70-76%, with the maximum light transmittance at the wavelength of 450 nm.

Therefore, as designed, in the RGB-LED, the wavelength of the red-light LED is set to be 660 nm or 730 nm, the light emission wavelength of the green-light LED is set to be 530 nm, and the light emission wavelength of the blue-light LED is set to be 450 nm.

Based on FIG. 8, the luminance and the wavelength of light of each color are described as below by taking that the expected luminance is 100 cd/m².

The wavelength of the red light in RGB-LED is set to be 660 nm, and its light transmittance is 96%. Thus, the luminance of the red light source in RGB-LED is 100/96%/96%=108.5 cd/m².

The wavelength of the blue light in RGB-LED is set to be 450 nm, and its light transmittance is 76%. Thus, the luminance of the blue light source in RGB-LED is 100/76%/76%=173.1 cd/m².

The wavelength of the green light in RGB-LED is set to be 530 nm, and its light transmittance is 85%. Thus, the luminance of the green light source in RGB-LED is 100/85%/85%=138.4 cd/m².

Similarly, when the high-color-gamut LED is used, it is also necessary to set light of various colors in the high-color-gamut LED according to the above formula, so as to guarantee the uniformity of the final display luminance.

The present application further provides a sunlight screen, including the front light guide structure for the reflective TFT screen as described above, and the reflective TFT screen 5, and the reflective TFT screen 5 is attached to a side of the optical bonding layer 3 away from the light guide plate 1.

The present application can meet the outdoor application requirements, and can be widely applied to electronic bus stop boards, outdoor electronic newspaper reading screens, outdoor scenic spot guide signs, outdoor light pole display screens, E-book pad, tablet computer, etc. The present application achieves better definition when light is weak or dark pictures are displayed. Compared with the prior art, the embodiments of the present application achieve a better display effect.

The above descriptions are merely preferred embodiments of the present invention, and are not intended to limit the present invention. Any modifications, equivalent substitutions, improvements and the like made within the spirit and principles of the present invention should be included within the scope of protection of the present invention.

What is claimed is:

1. A front light guide structure for a reflective thin film transistor (TFT) screen, comprising:
    a light guide plate, comprising a light guide substrate, wherein scattering netted dots are fixed on one side of the light guide substrate, and the scattering netted dots are provided on the light guide substrate by ultra-violet (UV) nanoimprint lithography;
    a cover glass plate comprising a glass substrate and anti-reflective (AR) layers, wherein the AR layers are attached to two sides of the glass substrate respectively, the cover glass plate is provided at a first side of the light guide plate, wherein the first side of the light guide plate is adjacent to the scattering netted dots, and a gap exists between the cover glass plate and the light guide plate; and
    an optical bonding layer attached to a second side of the light guide plate, wherein the second side of the light guide plate is away from the cover glass plate;
    wherein a lamp bead is arranged on at least one side surface of an edge of the light guide plate, wherein the at least one side surface of the edge of the light guide plate is adjacent to the scattering netted dots; and the lamp bead is configured to irradiate the light guide plate; and
    wherein luminance of a light source in the lamp bead meets the following formula:

$$L_k = L_e/A_k/A_k,$$

wherein L represents the luminance, A represents light transmittance of the light source when the light source transmits through a color filter (CF) layer in the reflective TFT screen, $L_e$ represents expected reflection luminance, and K represents a light color constituting light of the lamp bead.

2. The front light guide structure according to claim 1, wherein the light guide substrate is an ultra-white glass, polycarbonate (PC) or polymethyl methacrylate (PMMA) plate.

3. The front light guide structure for the reflective TFT screen according to claim 1, further comprising a seal, wherein the seal is circumferentially arranged at an edge of the gap between the cover glass plate and the light guide plate in a sealing manner.

4. The front light guide structure for the reflective TFT screen according to claim 1, wherein the seal is a double-sided foam adhesive.

5. The front light guide structure for the reflective TFT screen according to claim 1, wherein the optical bonding layer is an optically clear adhesive (OCA) or optical clear resin (OCR).

6. The front light guide structure for the reflective TFT screen according to claim 1, wherein each of the AR layers is deposited on a surface of the glass substrate by vacuum evaporation.

7. The front light guide structure for the reflective TFT screen according to claim 1, wherein a wavelength of each of light colors constituting light of the lamp bead is a wavelength of a corresponding light color, wherein the corresponding light color has a maximum light transmittance when transmitting through a CF layer in the reflective TFT screen.

8. The front light guide structure for the reflective TFT screen according to claim 1, wherein the lamp bead is a light source consisting of red, green and blue LEDs (RGB-LED) or a high-color-gamut LED.

9. A sunlight screen, comprising:
the front light guide structure for the reflective TFT screen according to claim 1, and
the reflective TFT screen, wherein the reflective TFT screen is attached to a side of the optical bonding layer, wherein the side of the optical bonding layer is away from the light guide plate.

10. The front light guide structure for the reflective TFT screen according to claim 1, wherein the light guide substrate is an ultra-white glass, PC or PMMA plate.

11. The front light guide structure for the reflective TFT screen according to claim 1, wherein the lamp bead is an RGB-LED or a high-color-gamut LED.

12. The front light guide structure for the reflective TFT screen according to claim 7, wherein the lamp bead is an RGB-LED or a high-color-gamut LED.

13. The sunlight screen according to claim 9, further comprising a seal, wherein the seal is circumferentially arranged at an edge of the gap between the cover glass plate and the light guide plate in a sealing manner.

14. The sunlight screen according to claim 13, wherein the seal is a double-sided foam adhesive.

15. The sunlight screen according to claim 9, wherein the optical bonding layer is an optically clear adhesive (OCA) or optical clear resin (OCR).

16. The sunlight screen according to claim 9, wherein each of the AR layers is deposited on a surface of the glass substrate by vacuum evaporation.

17. The sunlight screen according to claim 9, wherein a lamp bead is arranged on at least one side surface of an edge of the light guide plate, wherein the at least one side surface of the edge of the light guide plate is adjacent to the scattering netted dots; and the lamp bead is configured to irradiate the light guide plate.

\* \* \* \* \*